United States Patent
Arbesman

(10) Patent No.: US 9,950,495 B2
(45) Date of Patent: Apr. 24, 2018

(54) SYSTEM AND METHOD FOR ADDITIVE MANUFACTURING OF A THREE-DIMENSIONAL OBJECT

(71) Applicant: NuGripmetal S.A.R.L., Luxembourg (LU)

(72) Inventor: Ray Arbesman, Toronto (CA)

(73) Assignee: NUGRIPMETAL S.A.R.L., Luxembourg (LU)

( * ) Notice: Subject to any disclaimer, the term of this patent is extended or adjusted under 35 U.S.C. 154(b) by 333 days.

(21) Appl. No.: 14/808,448

(22) Filed: Jul. 24, 2015

(65) Prior Publication Data

US 2016/0023311 A1   Jan. 28, 2016

Related U.S. Application Data

(63) Continuation-in-part of application No. 14/533,218, filed on Nov. 5, 2014.

(30) Foreign Application Priority Data

Jul. 24, 2014   (CA) .................................... 2857790

(51) Int. Cl.
  *B29C 64/147* (2017.01)
  *B32B 5/14* (2006.01)
  (Continued)

(52) U.S. Cl.
  CPC .............. *B32B 5/147* (2013.01); *B23P 15/00* (2013.01); *B23P 15/246* (2013.01);
  (Continued)

(58) Field of Classification Search
  CPC .................... B33Y 10/00; B32B 15/00; B32B 15/04–15/12; B32B 15/18;
  (Continued)

(56) References Cited

U.S. PATENT DOCUMENTS 1,897,088 A   2/1933   Victor
1,915,221 A   6/1933   Fitzgerald
(Continued)

FOREIGN PATENT DOCUMENTS

CA   2038152 A1   9/1992
CA   1330521 C    7/1994
(Continued)

OTHER PUBLICATIONS

Tanged Metal Reinforced Graphite Gasket datasheet, Ningbo Sunwell Fluid Technologies Co. Ltd. 2010.
(Continued)

*Primary Examiner* — Carson Gross
(74) *Attorney, Agent, or Firm* — Kilpatrick Townsend & Stockton LLP

(57) ABSTRACT

A method for additive manufacturing of a three-dimensional object includes: a) identifying a set of sequentially extending planar cross-sectional shapes of the three-dimensional object; b) cutting a metal sheet into a plurality of planar metal pieces, each metal piece cut to a metal piece shape corresponding to a respective one of the cross-sectional shapes, wherein the metal sheet has a first face with a first plurality of barbs extending therefrom, and an opposed second face with a second plurality of barbs extending therefrom; c) cutting a substrate sheet into a plurality of planar substrate pieces, each substrate sheet cut to a substrate piece shape corresponding to a respective one of the cross-sectional shapes; and d) positioning the metal pieces and the substrate pieces in facing relation in an alternating pattern and in sequential order, and pressing the metal pieces and substrate pieces together to force the barbs to penetrate the substrate pieces.

15 Claims, 10 Drawing Sheets

(51) Int. Cl.

| | | |
|---|---|---|
| *B23P 15/00* | (2006.01) | |
| *B23P 15/24* | (2006.01) | |
| *B29C 33/30* | (2006.01) | |
| *B32B 7/12* | (2006.01) | |
| *B32B 15/18* | (2006.01) | |
| *B33Y 10/00* | (2015.01) | |
| *B33Y 30/00* | (2015.01) | |
| *B32B 15/04* | (2006.01) | |
| *F16B 15/00* | (2006.01) | |
| *B32B 15/10* | (2006.01) | |
| *B32B 3/30* | (2006.01) | |

(52) U.S. Cl.
CPC .......... *B29C 33/301* (2013.01); *B29C 64/147* (2017.08); *B32B 7/12* (2013.01); *B32B 15/18* (2013.01); *B33Y 10/00* (2014.12); *B33Y 30/00* (2014.12); *B23P 2700/12* (2013.01); *B32B 3/30* (2013.01); *B32B 15/04* (2013.01); *B32B 15/10* (2013.01); *B32B 2250/42* (2013.01); *B32B 2419/06* (2013.01); *B32B 2471/00* (2013.01); *B32B 2607/00* (2013.01); *F16B 15/0038* (2013.01); *F16B 15/0046* (2013.01); *Y10T 156/1062* (2015.01); *Y10T 156/1075* (2015.01)

(58) Field of Classification Search
CPC . B32B 2250/42; B32B 2607/00; B32B 3/266; Y10T 156/1062; Y10T 156/1064; Y10T 156/1075; F16B 5/07; F16B 15/003; F16B 15/0038; F16B 15/0046; B29C 64/141; B29C 64/147
See application file for complete search history.

(56) References Cited

U.S. PATENT DOCUMENTS

| | | |
|---|---|---|
| 2,171,530 A | 9/1939 | Balfe |
| 2,255,268 A | 9/1941 | Perrine |
| 2,274,765 A | 3/1942 | Zalkind et al. |
| 3,092,532 A | 6/1963 | Swick et al. |
| 3,170,354 A | 2/1965 | Scholl |
| 3,153,950 A | 5/1970 | Ratcliffe et al. |
| 3,513,950 A | 5/1970 | Ratcliffe et al. |
| 3,533,891 A | 10/1970 | Puyear |
| 3,551,232 A | 12/1970 | Thompson |
| 3,557,407 A | 1/1971 | Lemelson |
| 3,605,360 A | 9/1971 | Lindal |
| 3,615,994 A | 10/1971 | MacLaine et al. |
| 4,023,613 A | 5/1977 | Uebayasi et al. |
| 4,234,638 A | 11/1980 | Yamazoe et al. |
| 4,552,252 A | 11/1985 | Stahl |
| 4,569,424 A | 2/1986 | Taylor, Jr. |
| 4,640,390 A | 2/1987 | Saumweber et al. |
| 4,653,242 A | 3/1987 | Ezard |
| 4,705,278 A | 11/1987 | Locacius et al. |
| 4,723,783 A | 2/1988 | Belter et al. |
| 4,776,602 A | 10/1988 | Gallo |
| 4,781,389 A | 11/1988 | Beyer et al. |
| 4,799,579 A | 1/1989 | Myers et al. |
| 4,815,172 A | 3/1989 | Ward |
| 4,911,972 A | 3/1990 | Mercuri |
| 4,939,818 A | 7/1990 | Hahn |
| 5,031,483 A | 7/1991 | Weaver |
| 5,067,210 A | 11/1991 | Keyaki |
| 5,142,743 A | 9/1992 | Hahn |
| 5,143,184 A | 9/1992 | Snyder et al. |
| 5,172,920 A | 12/1992 | Schlenk |
| 5,261,512 A | 11/1993 | Young |
| 5,362,074 A | 11/1994 | Gallo et al. |
| 5,376,410 A | 12/1994 | MacKelvie |
| 5,413,194 A | 5/1995 | Kulis, Jr. et al. |
| 5,469,604 A | 11/1995 | Calmettes et al. |
| D374,609 S | 10/1996 | Akeno |
| D376,533 S | 12/1996 | Akeno |
| 5,585,166 A | 12/1996 | Kearsey |
| 5,611,122 A | 3/1997 | Torigoe et al. |
| 5,732,800 A | 3/1998 | Spigener |
| 5,738,924 A | 4/1998 | Sing |
| 5,788,247 A | 8/1998 | Tensor |
| D400,427 S | 11/1998 | Okawa et al. |
| 5,842,546 A | 12/1998 | Biswas |
| 5,879,489 A | 3/1999 | Burns et al. |
| 5,896,629 A | 4/1999 | Van Hooreweder |
| 6,022,502 A | 2/2000 | Lockhart et al. |
| D425,405 S | 5/2000 | Naohara et al. |
| 6,170,620 B1 | 1/2001 | Akita et al. |
| 6,247,704 B1 | 6/2001 | Battistoni |
| 6,258,457 B1 | 7/2001 | Ottinger et al. |
| 6,276,045 B1 | 8/2001 | Buchi et al. |
| 6,279,222 B1 | 8/2001 | Bunker et al. |
| 6,383,678 B1 | 5/2002 | Kaneko et al. |
| 6,431,331 B1 | 8/2002 | Arbesman |
| 6,464,047 B1 | 10/2002 | Arbesman |
| 6,622,346 B2 | 9/2003 | Graham et al. |
| 6,671,935 B2 | 1/2004 | Filion et al. |
| 6,843,095 B2 | 1/2005 | Arbesman |
| 6,860,368 B2 | 3/2005 | Kulis, Jr. et al. |
| 6,910,255 B2 | 6/2005 | Arbesman |
| 6,913,673 B2 | 7/2005 | Baggot et al. |
| 7,048,097 B2 | 5/2006 | Arbesman |
| 7,175,007 B2 | 2/2007 | Roberts |
| 7,222,701 B2 | 5/2007 | Pham |
| 7,320,386 B2 | 1/2008 | Kulis, Jr. et al. |
| 7,686,142 B2 | 3/2010 | Jung |
| 7,841,052 B2 | 11/2010 | Ducauchuis |
| 7,989,049 B2 | 8/2011 | Potier |
| 8,048,507 B2 | 11/2011 | Townsend et al. |
| 8,088,316 B2 | 1/2012 | Muth et al. |
| D654,355 S | 2/2012 | Cheng |
| 8,407,864 B2 | 4/2013 | Mask et al. |
| 8,683,840 B2 | 4/2014 | Tuma et al. |
| 8,685,520 B2 | 4/2014 | Meyer et al. |
| 9,259,899 B1 | 2/2016 | Arbesman |
| 9,273,741 B1 | 3/2016 | Arbesman et al. |
| 9,360,067 B1 | 6/2016 | Arbesman et al. |
| 9,388,872 B1 | 7/2016 | Arbesman et al. |
| 2002/0169435 A1 | 11/2002 | Neeb et al. |
| 2002/0170789 A1 | 11/2002 | Poelemans |
| 2003/0127291 A1 | 7/2003 | Wood et al. |
| 2004/0016608 A1 | 1/2004 | Gutowski |
| 2004/0099493 A1 | 5/2004 | Himmelsbach et al. |
| 2004/0140165 A1 | 7/2004 | Pham |
| 2004/0182672 A1 | 9/2004 | Hartner et al. |
| 2005/0170157 A1 | 8/2005 | Armela et al. |
| 2006/0027427 A1 | 2/2006 | Anda et al. |
| 2006/0093802 A1 | 5/2006 | Tsai |
| 2006/0118238 A1 | 6/2006 | Borazghi |
| 2006/0243017 A1 | 11/2006 | Jung et al. |
| 2006/0246256 A1 | 11/2006 | Ausen et al. |
| 2006/0260881 A1 | 11/2006 | Henley et al. |
| 2008/0003401 A1 | 1/2008 | Barnes et al. |
| 2009/0223753 A1 | 9/2009 | Kappagantu et al. |
| 2010/0170758 A1 | 7/2010 | Chen |
| 2010/0207334 A1 | 8/2010 | Virgin et al. |
| 2011/0051724 A1 | 3/2011 | Scott et al. |
| 2011/0079065 A1 | 4/2011 | Cabanski et al. |
| 2011/0233875 A1 | 9/2011 | Shaver et al. |
| 2011/0260371 A1 | 10/2011 | Arora et al. |
| 2012/0003462 A1 | 1/2012 | Wong |
| 2012/0006959 A1 | 1/2012 | Braun et al. |
| 2013/0152654 A1 | 6/2013 | Arbesman et al. |
| 2013/0175127 A1 | 7/2013 | MacKelvie |
| 2015/0024231 A1 | 1/2015 | Kutsumiza et al. |
| 2015/0053517 A1 | 2/2015 | Arbesman et al. |
| 2015/0086750 A1 | 3/2015 | Arbesman et al. |
| 2015/0099093 A1 | 4/2015 | Arbesman et al. |
| 2015/0140255 A1 | 5/2015 | MacKelvie |
| 2015/0239201 A1 | 8/2015 | Walker |
| 2016/0046110 A1 | 2/2016 | Broering et al. |
| 2016/0091041 A1 | 3/2016 | Arbesman |

(56) References Cited

U.S. PATENT DOCUMENTS

| | | |
|---|---|---|
| 2016/0160944 A1 | 6/2016 | Arbesman et al. |
| 2016/0176152 A1 | 6/2016 | Mackelvie |
| 2016/0230792 A1 | 8/2016 | Arbesman et al. |

FOREIGN PATENT DOCUMENTS

| | | |
|---|---|---|
| CA | 1337622 C | 11/1995 |
| CA | 2127339 A1 | 1/1996 |
| CA | 2272115 A1 | 11/1999 |
| CA | 2300401 | 12/1999 |
| CA | 2391183 A1 | 12/2003 |
| CA | 2778455 A1 | 11/2013 |
| CA | 145893 S | 12/2013 |
| CA | 2780397 A1 | 12/2013 |
| CA | 2798303 A1 | 6/2014 |
| CA | 2821897 A1 | 1/2015 |
| CN | 1599846 A | 3/2005 |
| CN | 102272471 | 12/2011 |
| CN | 203404286 U | 1/2014 |
| DE | 19754740 A1 | 3/1999 |
| DE | 102004048464 A1 | 4/2006 |
| DE | 102006015100 A1 | 10/2007 |
| DE | 102006015145 A1 | 10/2007 |
| DE | 102006015148 A1 | 10/2007 |
| EP | 0859163 A1 | 8/1998 |
| EP | 0934820 A2 | 8/1999 |
| EP | 1090728 A2 | 4/2001 |
| GB | 2125126 A | 2/1984 |
| GB | 2359186 | 8/2001 |
| GB | 2507128 A | 4/2014 |
| JP | 48072067 | 9/1973 |
| JP | 49126532 | 12/1974 |
| JP | 59174431 | 11/1984 |
| JP | 4-3136 U | 1/1992 |
| JP | 04223157 | 8/1992 |
| JP | 05285561 | 11/1993 |
| JP | 6-94057 A | 4/1994 |
| JP | 8021462 | 1/1996 |
| JP | 09011387 | 1/1997 |
| JP | 2001001058 | 1/2001 |
| JP | 2003154423 | 5/2003 |
| JP | 2013012626 | 1/2013 |
| JP | 2013053687 | 3/2013 |
| JP | 2013089799 | 5/2013 |
| WO | 00/00344 A1 | 1/2000 |
| WO | WO 02/090792 | 11/2002 |
| WO | 2011051724 A2 | 5/2011 |
| WO | 2013177667 A1 | 12/2013 |
| WO | 2015010183 A1 | 1/2015 |
| WO | 2015157846 | 10/2015 |

OTHER PUBLICATIONS

Tanged Graphite datasheet, Alba Gaskets.
Graphite Sheet with Tanged Metal datasheet, Cixi Cazseal Packing & Gasket Co, Ltd.
Supagraf Expanded Graphite Jointings datasheet, James Walker & Co.
SLT-20 Tang Sheet Specifications datasheet, Dynoteq Kft.
Tanged Stainless Steel Reinforced Graphite Sheet datasheet, Gee Graphite.
Specification Sheet: SPG7003, SPG Gaskets Co.
Graphite Sheet Gaskets, Environmental Gasket Company Ltd. 2009.
Misiolek et al., "Rapid prototyping of extrusion dies using layer-based techniques", 1999, J. Mater. Eng. Perform., 8 (1):23-30.
Walczyk et al., "Rapid Tooling for Sheet Metal Forming Using Profiled Edge Laminations—Design Principles and Demonstration", 1998, J. Manuf. Sci. Eng., 120(4):746-754.

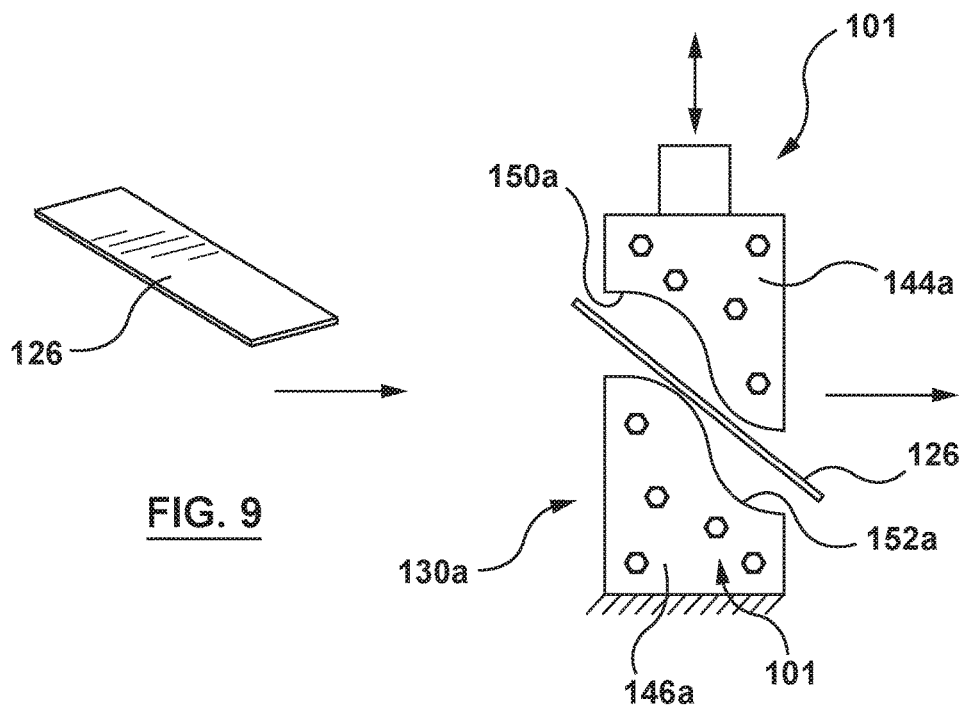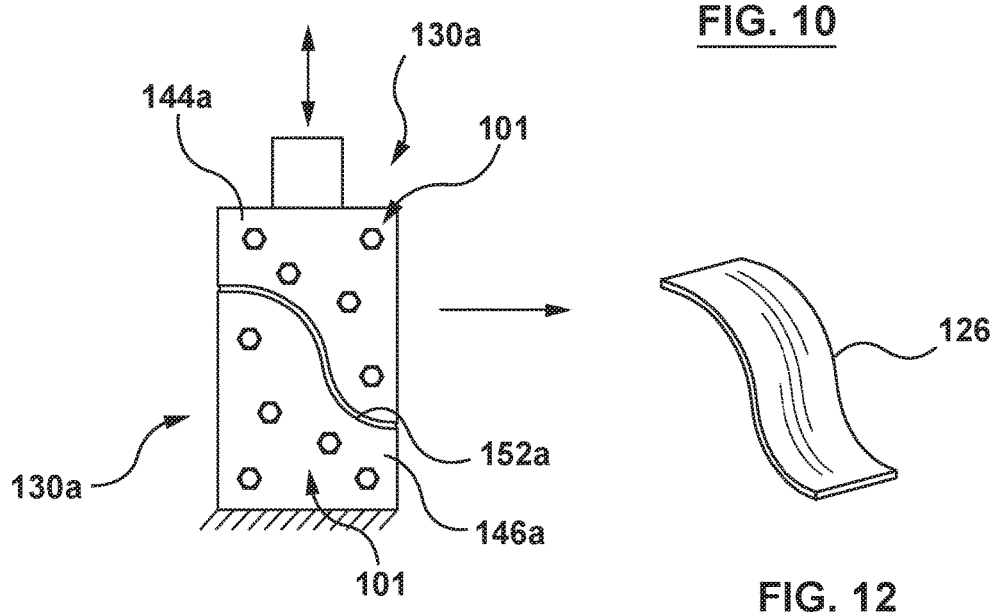

SYSTEM AND METHOD FOR ADDITIVE MANUFACTURING OF A THREE-DIMENSIONAL OBJECT

CROSS-REFERENCE TO RELATED APPLICATIONS

This application is a continuation in part of U.S. patent application Ser. No. 14/533,218, filed on Nov. 5, 2014, which claims priority from Canadian Patent Application No. 2,857,790, filed on Jul. 24, 2014, both of which are incorporated herein by reference in their entirety.

BACKGROUND OF THE INVENTION

Field

The disclosure relates generally to multi-layer composite structures, and more particularly to such structures with metal laminae and non-metal laminae. More specifically, the disclosure relates to systems and methods for additive manufacturing of a three-dimensional object using metal laminae and non-metal laminae.

Description of the Related Art

U.S. Pat. No. 3,605,360 (to S. W. Lindal) purports to disclose a process in which during the manufacture of beams, vertical laminations of wood are held securely in an opposite bending moment to that anticipated after their erection in a building. While so held, they are relatively moved to respective sides of a vertical metal lamination or laminations, which in turn are optionally longitudinally pulled at the bottom of each of their respective ends. Then all vertical laminations are moved together under compressive forces and secured with fasteners. Optionally, the fasteners may be formed from and remain a part of the metal lamination or laminations. After securement by fasteners and then upon release from bending, pulling and compressive forces, the derived pre-stressed wood and metal beam is ready for inclusion in an overall structure.

SUMMARY

The following summary is intended to introduce the reader to various aspects of the applicant's teaching, but not to define any invention.

According to some aspects, a method for additive manufacturing of a three-dimensional object comprises a) identifying a set of planar cross-sectional shapes of the three-dimensional object, the set extending in a sequence from a first end of the three-dimensional object to an opposed second end of the three-dimensional object; b) cutting at least one metal sheet into a plurality of planar metal pieces, each metal piece cut to a respective metal piece shape corresponding to a respective one of the cross-sectional shapes, wherein the metal sheet has a first face with a first plurality of barbs extending therefrom, and an opposed second face with a second plurality of barbs extending therefrom; c) cutting at least one substrate sheet into a plurality of planar substrate pieces, each substrate sheet cut to a respective substrate piece shape corresponding to a respective one of the cross-sectional shapes; and d) positioning the metal pieces and the substrate pieces in facing relation to each other in an alternating pattern and in an order corresponding to the sequence, and pressing the metal pieces and substrate pieces together to force the barbs of the metal pieces to penetrate the substrate pieces and bind the metal pieces and substrate pieces together.

Step a) may comprise generating a computer model of the series of cross-sectional shapes. Step a) may comprise scanning a prototype of the three-dimensional object, and generating the computer model based on the scan. Steps b) and c) may be automated based on the identified set of cross-sectional shapes.

Step b) may comprise at least one of stamping, punching, milling, sanding, grinding, carving, and laser-cutting the metal sheet. Step c) may comprise at least one of stamping, punching, milling, sanding, grinding, carving, and laser-cutting the substrate sheet.

The metal sheet may be steel, and the substrate sheet may be wood.

Prior to step d), an adhesive may be applied between at least some of the metal pieces and substrate pieces.

Step c) may comprise positioning a first one of the substrate pieces adjacent the first face of a first one of the metal pieces; positioning a second one of the substrate pieces adjacent the second face of the first one of the metal pieces; and pressing the first one of the substrate pieces, the first one of the metal pieces, and the second one of the substrate pieces together.

Step c) may further comprise positioning an additional one of the metal pieces adjacent the second one of the substrate pieces; positioning an additional one of the substrate pieces adjacent the additional one of the metal pieces; and pressing the additional one of the substrate pieces, the additional one of the metal pieces, and the second one of the substrate pieces together.

The pressing step may be carried out repeatedly as each one of the substrate pieces is positioned adjacent a respective one of the metal pieces. Alternatively, the pressing step may be carried out after all of the metal pieces and the substrate pieces have been positioned in facing relation to each other in an alternating pattern. The pressing step may comprise applying a roller to one of the substrate pieces.

The method may further comprise smoothing the bound metal pieces and substrate pieces.

According to some aspects, a system for additive manufacturing of a three-dimensional object comprises a controller for identifying a set of planar cross-sectional shapes of the three-dimensional object. The set extends in a sequence from a first end of the three-dimensional object to a second end of the three-dimensional object. The system further comprises at least one cutting station for cutting at least one barbed metal sheet into a plurality of planar barbed metal pieces corresponding to the cross-sectional shapes, and for cutting at least one substrate sheet into a plurality of planar substrate pieces corresponding to the cross-sectional shapes. The system further comprises a binding station for receiving the barbed metal pieces and the substrate pieces, positioning the barbed metal pieces and the substrate pieces in facing relation to each other in an alternating pattern and in an order corresponding to the sequence, and pressing the barbed metal pieces and substrate pieces together to force barbs of the metal pieces to penetrate the substrate pieces and bind the metal pieces and substrate pieces together.

The controller may be configured to scan a prototype of the three-dimensional object, and identify the series of cross-sectional shapes based on the scan.

The at least one cutting station may comprise a first cutting station for cutting the barbed metal sheet, and a second cutting station for cutting the substrate sheet.

The binding station may comprise a roller for pressing the barbed metal pieces and substrate pieces together.

The may further comprise a feed station for feeding the barbed metal sheet to the cutting station from a roll.

The cutting station may be a stamping station.

Also disclosed herein is a multi-layer structure (also referred to as a multi-layer composite structure) of alternating metal laminae and substrate laminae (also referred to as barb-penetrable laminae). The metal may be steel and the substrate may be wood. Each lamina may have two opposed faces (i.e. a first face and an opposed second face), and the laminae may be arranged so that the opposed faces of the laminae are parallel to each other. Faces of the metal laminae that are adjacent a face of a substrate lamina are textured with barbs that penetrate the adjacent face of the adjacent substrate lamina. The metal laminae may also be referred to herein as barbed metal laminae.

The laminae may also optionally be secured together by a fastener. The laminae may be secured together by multiple spaced apart fasteners, each fastener extending though all the laminae generally perpendicular to the faces of the laminae.

Each lamina may have multiple holes through it. The holes in different laminae may be aligned to form multiple fastener passages through all the laminae. The fastener passages may be perpendicular to the faces of the laminae. The fasteners may be bolts that extend through the fastener passages and are secured to apply inward pressure on the laminae to secure the structure together.

The material of the substrate may be wood. The wood laminae may be formed from sheets of plywood or from lumber.

There may in some examples be exactly two outer laminae, each having one face that is not adjacent to the face of another lamina (i.e. one free face), where the outer laminae are both metal laminae.

Alternatively the outer laminae may both be substrate laminae.

Each lamina may have two substantially flat faces. The textured faces of the metal laminae may have barbs extending substantially perpendicularly from the flat faces. Each barb may have a pointed end that penetrates a face of an adjacent substrate lamina.

In some examples, adhesive may be applied between adjacent laminae. Alternatively, no adhesive may be used in the structure.

In some examples, each lamina may have the same profile so that one or more edges (also referred to herein as upper edges or upper surfaces) of the laminae form a combined surface that is two-dimensional.

Also disclosed herein is a forming die set including a die and a punch. The die may be a multi-layer structure as described above, and one or more edges of each respective laminae (e.g. one or more upper edges) making up the die together form a die working surface. The punch may also be a multi-layer structure as described above, and one or more edges of each respective lamina (e.g. one or more lower edges) of the punch may together form a punch working surface. The shapes of the working surfaces of the die and the punch may be complementary. The upper edges of the laminae of the die may be configured to form a smooth die working surface.

Also disclosed herein is a multi-layer structure formed from multiple metal laminae and multiple substrate laminae. Each substrate lamina may be sandwiched between two metal laminae. The structure may have two outer metal laminae, and each outer metal lamina may have a textured face with barbs. Each textured face may be adjacent to a substrate lamina. The structure may have one or more interior metal laminae, and each interior metal lamina may have two textured faces with barbs. Each, textured face may be adjacent to a substrate lamina. The structure may be formed by applying inward pressure to push the laminae together so that the barbs of each metal lamina pierce each adjacent substrate lamina, thereby binding adjacent laminae together. The laminae may also be secured together by a fastener extending through all the laminae. The laminae may be secured together by multiple spaced apart fasteners, and each fastener may extend though all the laminae perpendicular to the faces of the laminae. The structure may in some examples have exactly one interior metal lamina and two substrate laminae. The substrate material may be wood and the metal may be steel. In some examples, each outer lamina may have an outer face that is not textured.

Also disclosed herein is a method of making a multi-layer structure from: (1) two outer metal laminae, each outer metal lamina having a textured face with barbs; (2) N interior metal laminae, each interior metal lamina having two textured faces with barbs, where N is an integer greater than or equal to 1; and (3) N+1 substrate laminae. The laminae may be arranged so that the faces of the laminae are parallel to each other with the two outer metal laminae on the outside (i.e. at a first end and an opposed second end of the structure) with their textured faces facing inward, and with the substrate laminae and interior metal laminae alternating between the two outer metal laminae so that each substrate lamina is adjacent to the textured surfaces of two metal laminae. Then, inward pressure may be applied to push the laminae together so that the barbs of each metal lamina pierce each adjacent substrate lamina, thereby binding adjacent laminae together. Finally, the laminae may optionally be secured together by extending one or more fasteners through all the laminae. In some examples, multiple fasteners may be used, and each fastener may be extended though a respective one of multiple spaced apart fastener passages through all the laminae. The fastener passages may be perpendicular to the faces of the laminae.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 9 is a perspective view of a flat piece of material to be made into a finished part by the punch and die of FIG. 5;

FIG. 10 is a side view showing the piece of material of FIG. 9 positioned between the punch and die of FIG. 5;

FIG. 11 is a side view showing the piece of material of FIG. 9 being punched by the punch and die of FIG. 5;

FIG. 12 is a perspective view of an S-shaped finished part made by punching the flat piece of material of FIG. 9 with the punch and die of FIG. 5;

DETAILED DESCRIPTION

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Disclosed herein are multi-layer composite structures 101, such as multi-layer wood-steel composite structures, and systems and methods of making structures 101 from metal laminae and substrate laminae (such as wood and steel laminae, respectively). The structures 101 may be high strength, and made with low material and fabrication costs. Furthermore the structures 101 may be made in an automated process and in bulk.

Figure 1:
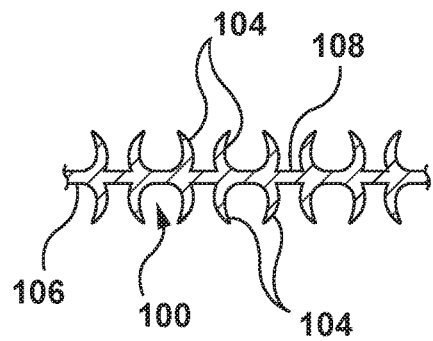
FIG. 1 is a cross-section through a metal lamina that includes barbs on opposed faces, taken through one row of the barbs on each face, and showing adjacent rows of barbs pointing in opposite directions, which may be created by rows of blades moving in opposite directions.
Figure 1A:
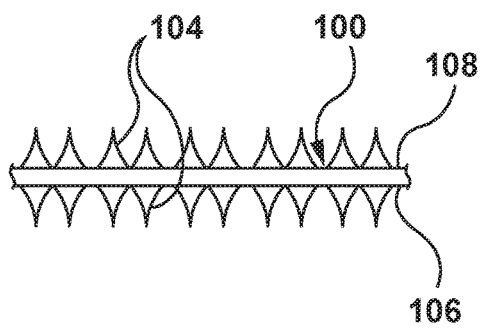
FIG. 1A is a partial end view of the metal lamina of FIG. 1, showing four rows of barbs.
Figure 2:
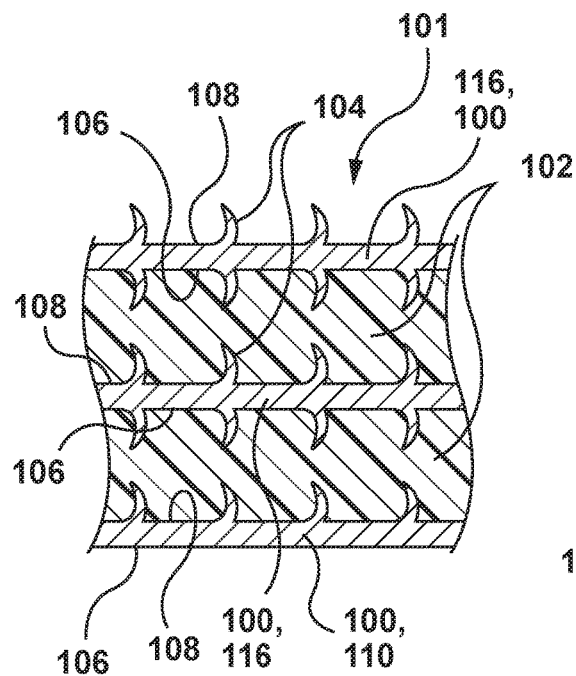
FIG. 2 is a cross-section taken through a middle portion of a multi-layer composite structure with two double-textured metal laminae, the upper one of which is ready to receive another substrate lamina, and a single-textured metal lamina on the lower surface of the composite structure.

Referring to FIGS. 1, 1a, and 2, the structures 101 disclosed herein may include two types of laminae: metal laminae 100 that are barbed (also referred to herein as "barbed metal laminae"), and that may be made from textured sheet metal, and substrate laminae 102 (also referred to as "barb-penetrable laminae"), which may be made from wood or another material penetrable by barbs 104 of the metal laminae 100. As used herein, the term "penetrable" or "penetrate" refers to the barbs 104 of the metal laminae 100 piercing or impaling the substrate laminae 102, thereby creating a hole in the substrate laminae 102.

As used herein, the term "lamina" refers to a thin sheet of material, which may have two opposed substantially flat faces (i.e. a first face 106 and an opposed second face 108, shown in FIGS. 1 to 2). The term "lamina" refer to bulk sheets of material (e.g. a sheet of material on a roll prior to being cut or assembled into a finished structure), or pieces of material cut from a sheet (e.g. stamped from a sheet). Furthermore, the term "lamina" may refer to pieces of material prior to assembly into a finished article, or after assembly into a finished article.

Referring to FIGS. 1 and 1a, a metal lamina 100 is shown that is barbed on both faces 106, 108. Such metal lamina 100 may be referred to as "double textured lamina" or "double barbed lamina". The barbs 104 on the first face 106 in the foreground may be made by using cutting tips that plow grooves into the metal surface from left to right, and the barbs 104 on the second face in the foreground 108 may be made by using cutting tips that plow grooves into the metal surface from right to left. In the example shown, the barbs 104 in the background point in opposite directions to the barbs 104 in the foreground. Referring to FIG. 1a, the barbs 104 can in some examples be arranged in rows.

The height, density, and shape (e.g. spike or hook) of the barbs 104 can be selected or optimized for the particular substrate material (e.g. soft or hard woods, plywood, fibreboard, and/or foam board) or for the application. In some examples, the barbs 104 can extend substantially perpendicular to the faces 106, 108 of the metal lamina 100 so that they are substantially straight in orientation. In other examples, the barbs 104 may deviate from perpendicular by a relatively small amount or by a relatively large amount. In some examples, the thickness of the barbs 104 decreases from their proximal end (i.e. the end closest to the face 106 or 108) to their distal end (i.e. the end furthest from the face 106 or 108), where they may be relatively pointed and sharp. Straight pointed barbs 104 may be able to penetrate substrate material without bending, and therefore allow the use of relatively hard substrate material.

The thickness of any given lamina may generally be less than its length or width, and in the case of a metal lamina 100, substantially less. For example, a steel lamina may have a thickness of 0.2 millimeters to 6.0 millimeters, whereas its length and width may be any size required for a particular application, for example, more than 50 millimeters. The length and width of the substrate laminae 102 may in some examples be the same or similar to those of the metal laminae 100 in the same structure, whereas the thickness of the substrate laminae 102 may generally be greater than that of the metal laminae 100 so that the substrate laminae 102 provide the bulk of the volume of the multi-layer composite structure 101. This may allow for the metal laminae 100 to contribute to the strength of the structure, while allowing for the structure 101 to be relatively lightweight. For example, for wood substrate laminae 102, the thickness of the laminae may in some examples be 6.0 millimeters to 50 millimeters. The thickness of each substrate lamina 102 in any one structure may be the same or similar, or may vary substantially, according to the design of the structure. The thickness of each metal lamina 100 in any one structure may also be the same or similar, or may vary. For example, the outer metal laminae 110 (i.e. the metal laminae 100 positioned at opposed first 112 and second 114 ends of the structure), shown in FIG. 3, may be selected to have a thickness different from the interior metal laminae 116 (shown in FIG. 3), or particular interior metal laminae 116 in regions of the structure designed to receive higher stresses may be thicker than the other metal laminae in the structure. In addition to being lower cost than an all-metal structure, the weight of the composite structure may also be substantially reduced.

Referring still to FIGS. 1, 1a, and 2, the metal laminae 100 may be made from textured steel with raised barbs 104 on one or both faces 106, 108. Any face with raised barbs may be referred to herein as a textured face. The barbs 104 may in some examples be provided in a dense array. The barbs 104 can have a density ranging from about 45 to 250 per square inch (7 to 38 per square centimeter), and can have a range of heights ranging from 0.025 to 0.060 inches (0.01 to 0.15 centimeters). The barbs 104 may be regularly spaced apart from each other. Such textured faces may be created, for example, by the methods disclosed in U.S. Pat. No. 5,376,410. Sheet metals textured with barbs are available from Nucap Industries Inc., (Toronto, Ontario, Canada).

The substrate laminae 102 may be non-metal, and in some examples may be wood. The substrate laminae 102 may alternatively be made from any material that can be penetrated by the barbs 104 of a textured face of a metal lamina 100 under pressure to bind the metal lamina 100 to the substrate lamina 102. For example, various plastics and resins may be employed. Furthermore, stiff foams, fibre board, and other such suitable substrate materials, or any combinations thereof, may be used.

Figure 3:
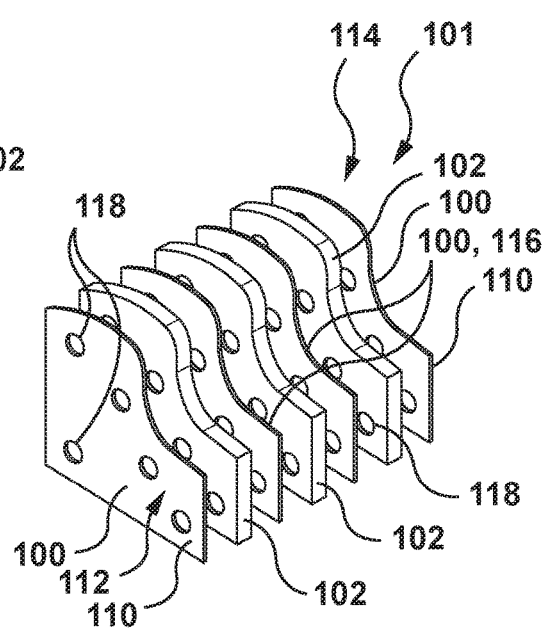
FIG. 3 is a perspective view of an unassembled set of alternating, same-profile substrate and metal laminae, where the thicker substrate laminae are in sheet form (such as plywood, particle or fibre board or combinations thereof), and where the intermediary metal laminae are double textured, and the outer metal laminae are single-textured.

Referring to FIGS. 2 and 3, in some examples, alternating substrate 102 and metal 100 laminae are employed, so that each substrate lamina 102 is sandwiched between two metal laminae 100. Two outer metal laminae 110, positioned at opposed ends 112, 114 of the structure, and one or more inner (or interior) metal laminae 116 may be employed. The inner metal laminae 116 may be double textured, while the outer metal laminae 110 may be single textured.

If the number of inner metal laminae 116 is referred to as "N" (where N is a positive integer equal to 1 or more), then N+1 substrate laminae 102 may be employed. For example, referring to FIG. 3, N is equal to two because there are two inner metal laminae 116. There are then three substrate laminae 102. The faces 106, 108 of each lamina are all oriented similarly in the structure 101 (i.e. so that the planes defined by those faces are all substantially parallel to each other). The two outer metal laminae 110 are positioned at the opposed ends 112, 114 of the structure, and are each textured with barbs 104 on only one face thereof (i.e. the first face 106 of one of the outer metal laminae 110 and the second face 108 of the other outer metal laminae 110). The outer metal laminae 110 are positioned so that the textured face of each outer metal lamina 110 is proximate to a face of the adjacent substrate lamina 102. The inner metal laminae 116 each have both faces 106, 108 textured with barbs. Since the substrate laminae 102 and inner metal laminae 116 alternate, as shown in FIG. 3, both faces 106, 108 of each substrate lamina 102 are adjacent to a textured face of a metal lamina 100.

Figure 4:
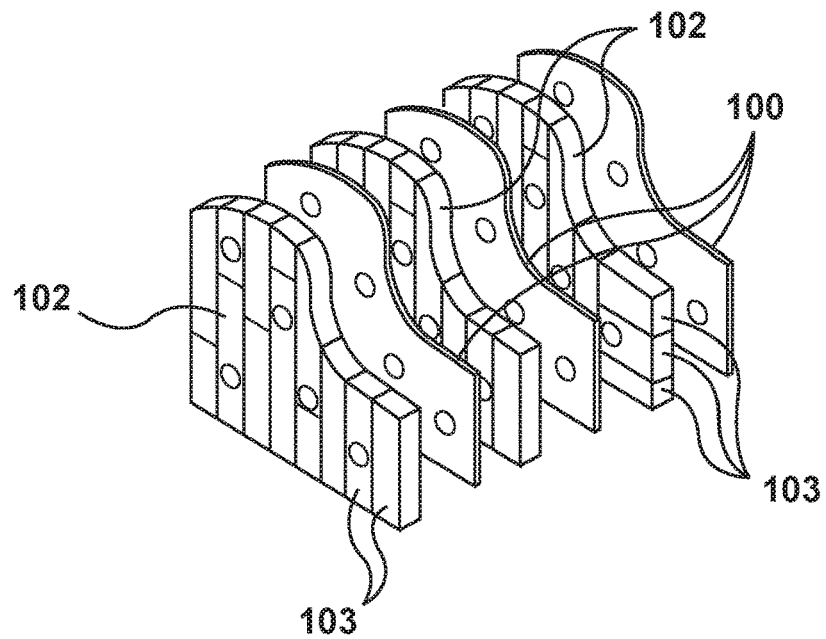
FIG. 4 is a perspective view of another unassembled set of alternating, same-profile substrate and metal laminae, where narrow and/or shorter pieces of substrate laminae (e.g. lumber) are assembled with textured metal laminae so that the metal collates the substrate and resists inter-surface movement when an external load is applied.

In an alternative structure 101 shown in FIG. 4, rather than using a single piece of substrate for each substrate lamina 102, narrow and/or shorter pieces 103 of substrate material (e.g. lumber) are assembled with metal laminae 100, so that the metal laminae 100 collates the substrate pieces 103, and resists inter-surface movement when an external load is applied.

Referring back to FIG. 3, a multi-layer structure 101 may be formed by applying inward pressure on the two outer laminae, for example the outer metal laminae 110, in a direction generally perpendicular to the faces of the laminae, so that the barbs 104 of each metal lamina 100 pierce each adjacent substrate lamina 102, to bind the laminae 100, 102 together to form the structure 101. When inward pressure is exerted against the outer metal laminae 110, the barbs 104 pierce and impale the substrate laminae 102, effectively surface-nailing the structure together. The barbs 104 can receive and distribute external loads and forces across the substrate laminae 102, to prevent relative movement such as twisting and slipping. The inward pressure may be applied, for example, by a press or a roll.

In some examples, rather than pressing all laminae 100, 102 together at one time, the laminae 100, 102 may be bound together by adding one lamina at a time to the structure and pressing that single lamina. For example a substrate lamina 102 may be pressed onto the textured face of the outermost metal lamina 100 that is already part of the structure, so that the barbs 104 penetrate the substrate lamina 102. Alternatively, a metal lamina 100 may be pressed onto the outer face of the outermost substrate lamina 102 that is already part of the structure so that the barbs 104 penetrate the substrate lamina 102.

If the structure 101 is to be used for applications that require significant force or pressure to be applied to the structure 101 in a direction parallel to the faces 106, 108 of the laminae 100, 102, the bonding of the laminae 100, 102 solely based on the penetration of the barbs 104 into the substrate laminae 102 may in some examples be insufficient to prevent the laminae 100, 102 from separating. Accordingly, in some examples, as shown in FIG. 3, the laminae 100, 102 have a pattern of aligned holes 118 that form a fastener passage through which fasteners (e.g. bolts 120 shown in FIGS. 5 and 7) can be inserted to secure the laminae 100, 102 together. Each hole 118 may include a cylindrical opening though the faces of a lamina, and the holes 118 in each lamina may be aligned to form a cylindrical passage from the outer face of the first outer lamina, through all the laminae, to the outer face of the second outer lamina. The fastener passages may be perpendicular to the faces 106, 108 of the laminae 100, 102.

Threaded cylindrical bolts 120 having a radius comparable to, or slightly less than, the radius of the holes 118 forming each fastener passage, can then be inserted though the fastener passage and secured, for example, by the head of the bolt on the outer surface of the first outer lamina and a nut threaded on the end of the bolt extending out from the second outer lamina so that the nut is tight to the outer surface of the second outer lamina. A sufficient number of fastener passages and fasteners distributed across the faces 106, 108 of the laminae 100, 102 can facilitate secure binding of the laminae 100, 102.

Figure 5:
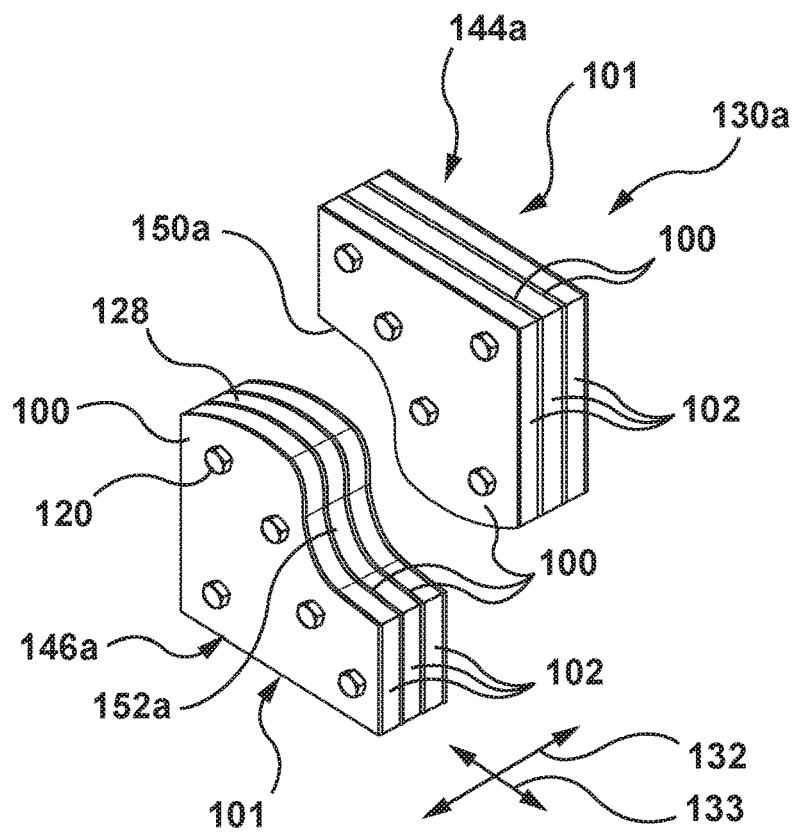
FIG. 5 is a perspective view of a punch and die made with substrate-metal laminae bound together with barbs and also secured together with threaded fasteners extending therethrough.
Figure 6:
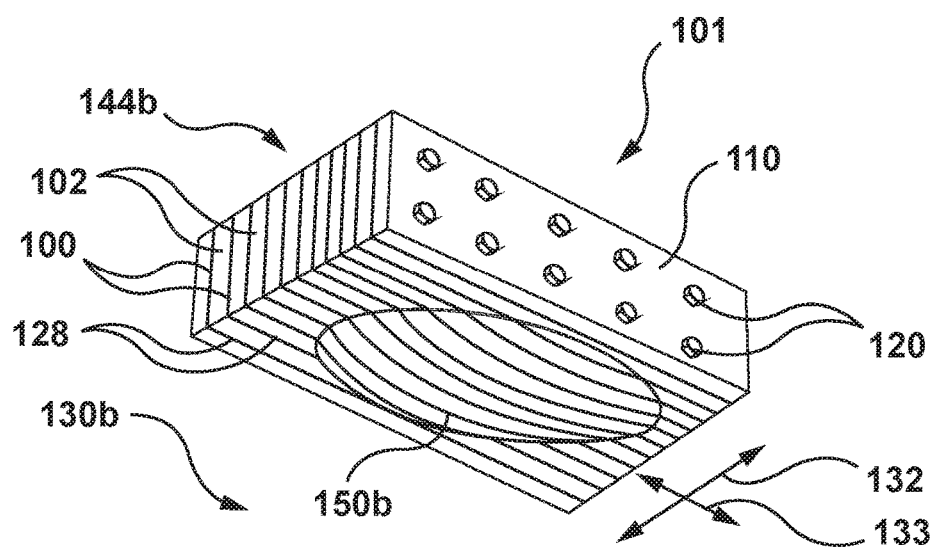
FIG. 6 is a perspective view of the upper punch of a die set, where the punch has a three-dimensional convex working surface formed by laminae in which the profiles change from one lamina to the next, and where rectangular laminae are positioned on the outsides (or ends), with laminae of differently curved profiles across the central section defining the convex working surface.
Figure 7:
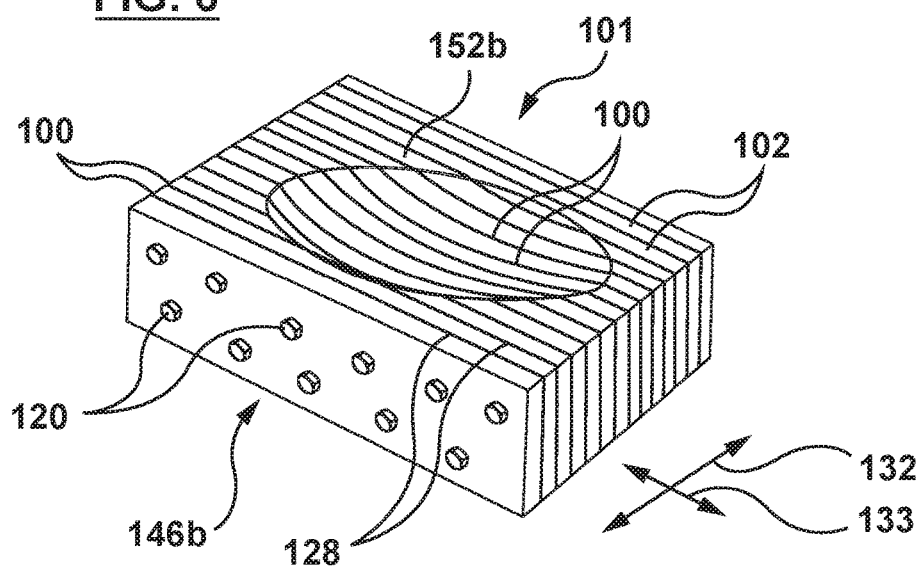
FIG. 7 is a perspective view of the lower die usable with the punch of FIG. 6, with a complementary three-dimensional concave working surface for the upper punch in FIG. 6.

Referring to FIGS. 5 to 7, the structures 101 include such passages and bolts 120. The passages and bolts 120 are spaced apart, generally in a regular or near-regular pattern, so that each is further from any other bolt 120 than the diameter of each fastener, and in some instances by more than twice the diameter of each bolt 120. The bolts 120 and fastener passages may in some examples all have the same diameter.

The multi-layer composite structures 101 shown in FIGS. 5 to 7 provide resistance to relative movement such as twisting and slippage between laminae 100, 102.

In some examples, permanent external clamping devices such as external bars or channels with threaded fasteners (not shown), may be included in a multi-layer composite structure.

In some examples, rather than a bolt 120, a ferruled metal clamping tube (not shown) may be employed as a fastener. Such a tube may have a diameter approximately equal to or slightly smaller than the diameter of the fastener passage through the laminae 100, 102 so that it can be inserted into the passage with a portion protruding or extending beyond each of the outer laminae. The laminae 100, 102 can then be fastened by pressing the protruding portions of the clamping tube so that they flatten outward to form flanges extending parallel to the faces 106, 108 of the laminae that are pressed flat against the faces of the two outer laminae. Such ferruled metal clamping tubes may be lightweight.

In some examples, adhesives may be applied between the laminae 100, 102. This can add strength to the multi-layer composite structures 101. However, in examples where adhesives are omitted, the structure 101 can potentially be disassembled by unfastening the fasteners so that the laminae 100, 102 can be separated. For example, a structure 101 may be disassembled in order to repair or replace one or more of the laminae 100, 102. Furthermore, in some cases, it may be desirable to change the configuration of the structure 101, such as to change its width by adding wider laminae and/or to add additional laminae to improve the strength of the structures 101.

As mentioned above, the two outer laminae may be outer metal laminae 110, with only one textured face. In alternative examples, one or both of the outer laminae may be substrate laminae 102. Furthermore, in some examples, the outer faces of one or two of the outer metal laminae 110 may also be textured so that the structure 101 itself may be further bonded to another substrate material by pressing the barbs 104 on the textured outer face of an outer metal lamina 110 into the other substrate material.

Figure 8:
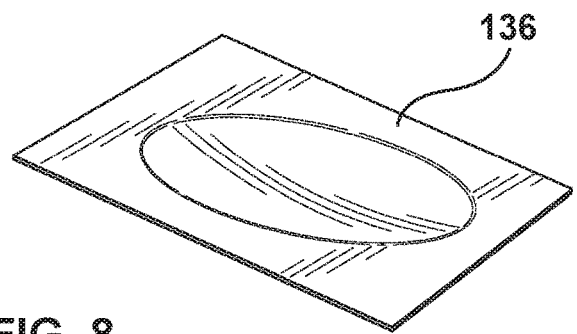
FIG. 8 is a perspective view of a finished part formed between the punch and die of FIGS. 6 and 7, respectively.

Referring now to FIGS. 5 to 7, die sets 130*a* (in FIG. 5) and 130*b* (in FIGS. 6 and 7) are shown. Each die set 130*a*, 130*b* includes two multi-layer composite structures 101. In this description, features of FIG. 5 will be referred to with reference numerals ending in the suffix "a". Similar features of FIGS. 6 and 7 will be referred to with the same reference numerals, ending in the suffix "b". In each given die set 130*a* and 130*b*, one multi-layer composite structure 101 forms a punch 144*a*, 144*b*, and the other structure 101 forms a die 146*a*, 146*b*. The punches 144*a*, 144*b* include respective punch working surfaces 150*a*, 150*b*, and the dies 146*a*, 146*b* include respective die working surfaces 152*a*, 152*b*. The working surfaces 150*a*, 150*b*, 152*a*, 152*b* are formed by the edges 128 (labelled in FIGS. 6 and 7) of the respective laminae. The laminae of each structure 101 are profile cut to form a working surface of a desired shape, which will define the shape of the finished part (e.g. part 136 shown in FIG. 8) formed by the die set.

As will be described in further detail below, within a given structure (i.e. punches 144*a* or 144*b*, or dies 146*a* or 146*b*), the profile of the laminae can be the same for all laminae (e.g. as in FIGS. 3 to 5), or can be different for some or all laminae (as in FIGS. 6 and 7). The punch working surface 150*a* and die working surface 152*a* have complementary shapes, and the punch working surface 150*b* and die working surface 152*b* have complementary shapes.

Referring now to FIG. 5, as mentioned above, in some examples, substrate laminae 102 and metal laminae 100 are cut to the same or a similar profile, positioned along an axis 132, and bound together via barbs in the metal laminae 100 to create a punch 144*b* or a die 146*b*. In FIG. 5, since the substrate laminae 102 and metal laminae 100 are cut to the same profile, the punch 144*a* and the die 146*b* have "two dimensional" surfaces. That is, the surfaces (e.g. punch working surface 150*a* and die working surface 152*a*) formed by the combined edges 128 of the laminae 100, 102 are linear and parallel to the axis 132 in the axial direction, but in a direction transverse to the axial direction (defined by transverse axis 133) can be non-linear and non-parallel to the transverse axis 133.

FIGS. 9 to 12 show a sequence of steps for the use of die set 130*a*. A flat workpiece 126 is placed on the die working surface 152*a*. As the punch 144*a* descends or closes against the die 146*a*, the workpiece 126 is formed against die working surface 152*a* and punch working surface 150*a*, and a finished part 136 is produced.

In alternative examples, multi-layer composite structures having two-dimensional surfaces may be used for a variety of other structures, for example a frame member, a press-type metal-forming die set, or a base for heavy machinery.

Referring to FIGS. 6 and 7, in other examples, the adjacent metal laminae 100 and wood laminae 102 are cut to different profiles, which vary from one to the next, creating at least one "three-dimensional" surface. In such a three-dimensional surface (e.g. the punch working surface 150*b* and the die working surface 152*b*, which are formed by the edges 128 of the laminae 100, 102) the shape of the surface can be non-linear and non-parallel to the axis 132 in the axial direction, and also non-linear and non-parallel to the axis 133 in the transverse direction. For example, in FIGS. 6 and 7, the punch working surface 150*b* and the die working surface 152*b* both change in shape in the axial direction and in the direction transverse to the axial direction. A multi-layer composite structure having a three-dimensional surface can be used in a press-type, metal-forming die set for forming "three-dimensional" shapes in sheet metal, such as the finished part 136 shown in FIG. 8, or other load-bearing structures having a concave-convex profile.

In both two-dimensional and three-dimensional surfaces, the shape of surface formed by the edges 128 can vary smoothly, as shown in FIGS. 5, 6, and 7. Alternatively, the shape can vary abruptly.

Figure 13:
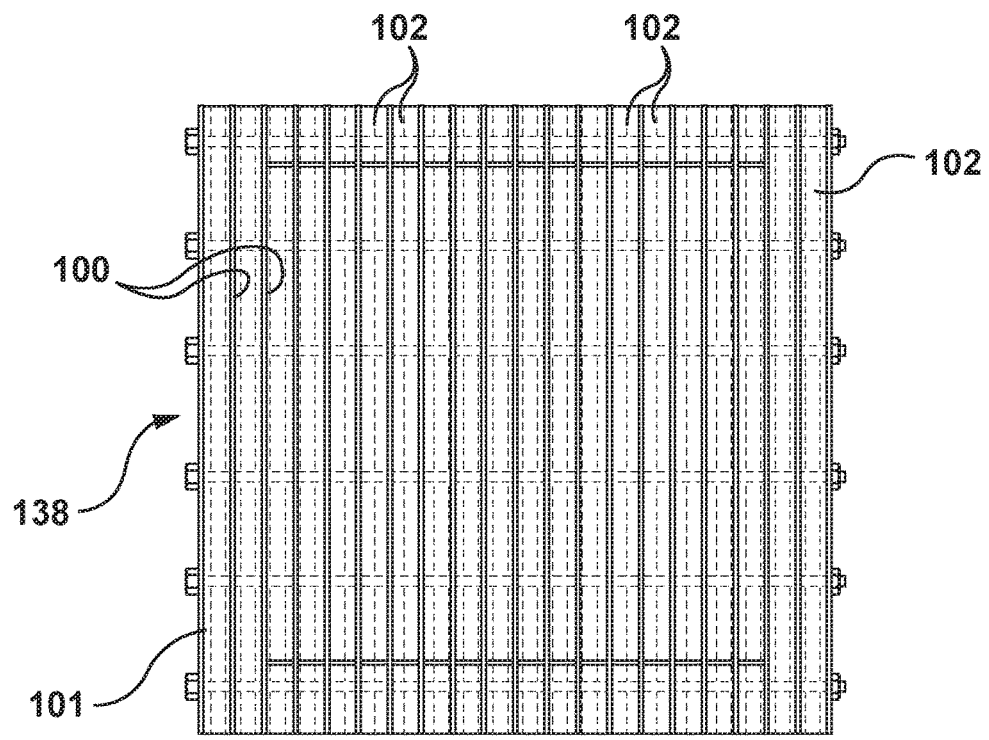
FIG. 13 is a top view of a multi-layer composite structure in the form of a box with four walls and a bottom made from both sheets and strips of substrate laminae and metal laminae, and with multiple threaded fasteners therethrough.
Figure 14:
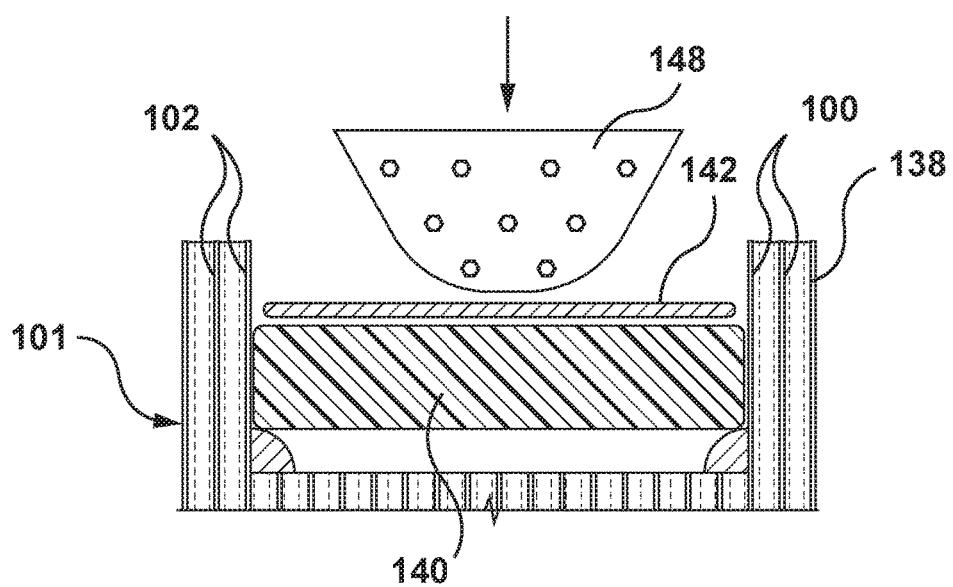
FIG. 14 a cross-section taken through the box of FIG. 13, with a raised elastomeric forming block and an unfinished piece of material therein, and with a punch positioned above the unfinished piece of material.
Figure 15:
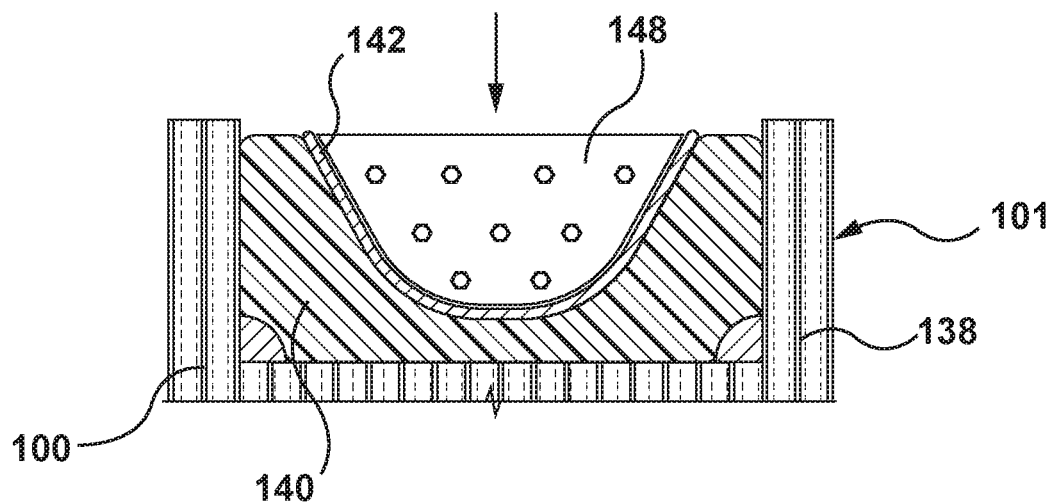
FIG. 15 shows the box of FIG. 14 with the punch descending, showing that the box restricts deformation of the elastomeric block in all directions except upwards, whereby it forces the unfinished piece of material into conformity with the shaped punch that descends from above.
Figure 16:
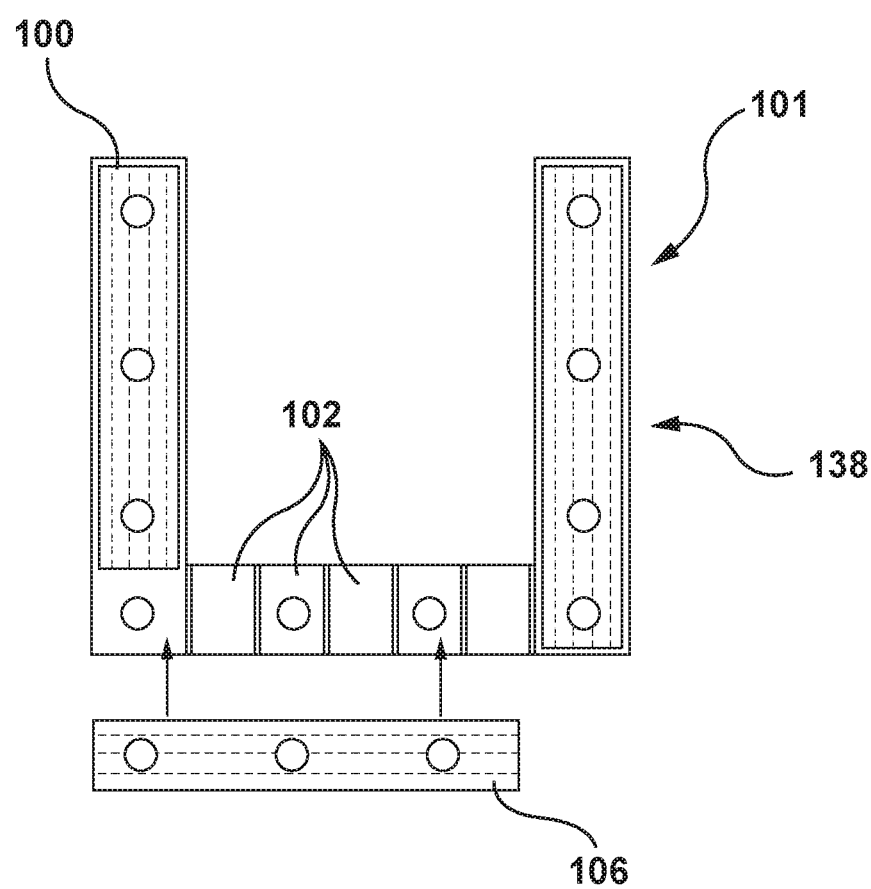
FIG. 16 is a schematic side view of the box of FIG. 14 being assembled, showing where strips of metal laminae and substrate laminae are used for the central portion of the box, and showing short end grain pieces of lumber used with metal laminae for the box bottom.

Referring now to FIGS. 13 to 15, an alternative die is shown. The die includes a multi-layer composite structure 101 in the form of a five-sided strong-walled box 138 open at the top. The box 138 is strong in the expansive sense in addition to having compressive strength. Various walls of the box may be made from laminae in the form of large sheets (e.g. the end walls), or in smaller strips (e.g. the side walls).

Referring to FIGS. 14 and 15, one or more elastomeric blocks 140 in the box 138 can support a flat sheet metal workpiece 142. Under the force of a descending punch 148 having a desired shape, and resisted by the retentive strength of the box 138, the elastomeric block 140 is forced to flow upwards, forming the workpiece 142 against the punch 148. On retracting the punch 148, the elastomeric block 140 returns to its original shape for the next form pressing.

Figure 17:
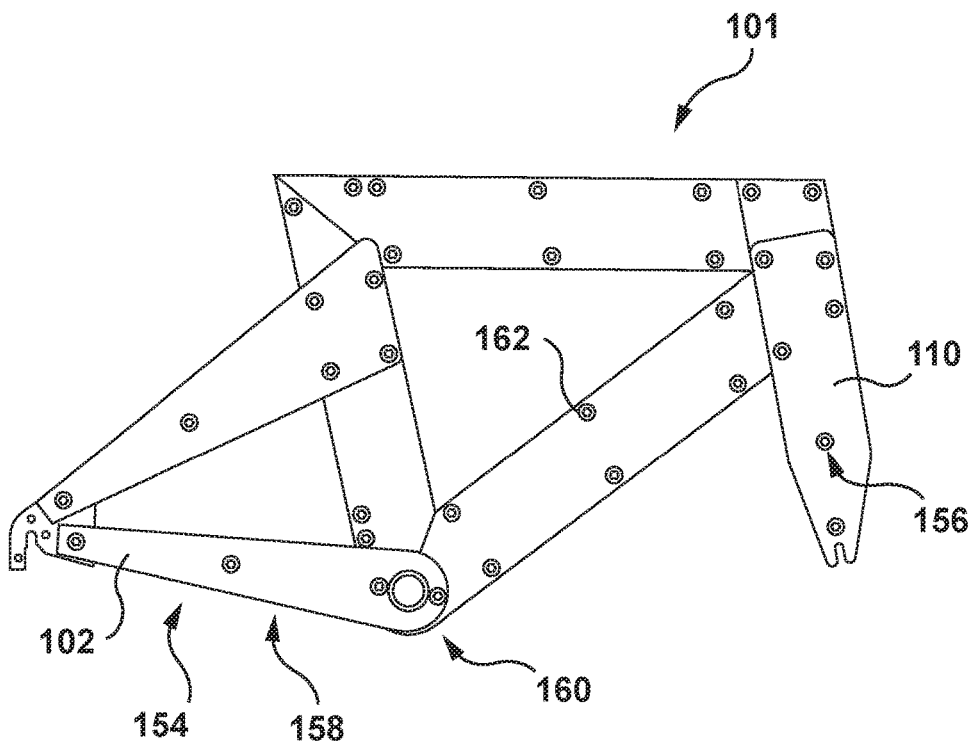
FIG. 17 is a side view of a bicycle frame fabricated from a multi-layer steel-wood composite structure.
Figure 18:
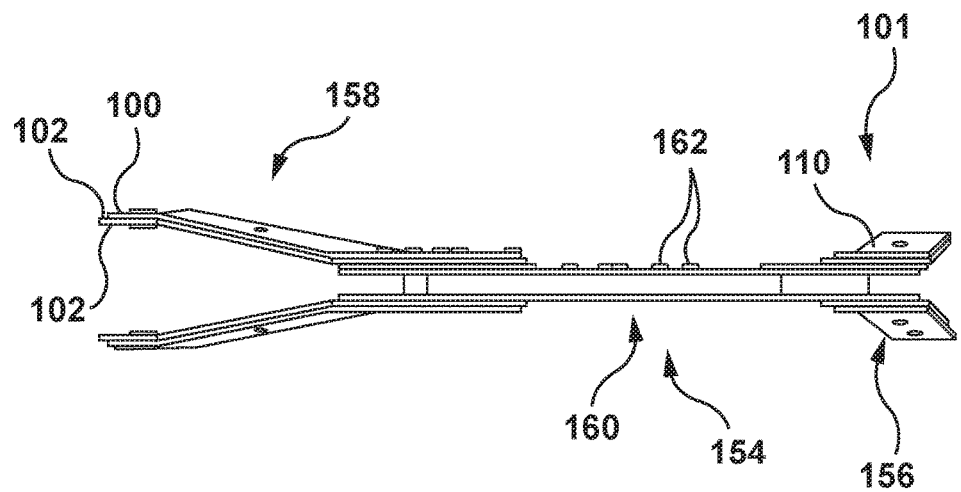
FIG. 18 is a top view of the bicycle frame of FIG. 17.

Another example of a multi-layer composite structure 101 is shown in FIGS. 17 and 18. In the example shown, the multi-layer composite structure 101 is a substructure 154 of a bicycle frame, including a front fork 156, a rear subframe 158, and a bottom bracket 160. The front fork 156 includes outer metal lamina 110 that are single-textured. The rear sub-frame 158 and bottom bracket 160 include substrate lamina 102 as the outer lamina. Ferruled clamping tubes 162 are added after press-assembling the laminae.

The multi-layer composite structures 101 described herein may have various other uses. For example, they may be used for machinery bases, load-bearing pads, floors, roofs and protection walls.

In examples where the substrate laminae 102 are wood laminae, the wood laminae can be cut from tree trunks comprising vertical tubular filaments defining their grain direction. Wood has high compressive strength along the grain direction. Where the tubular filaments have been cut perpendicular to the growth direction, the "end-grain" is exposed. In some examples, wood laminae may be oriented by their grain direction to provide the best resistance to the loads to be withstood. For example, short lumber pieces can be arranged having their end-grain aligned with the load and held in a side-by-side, load-bearing relationship by the metal laminae 100.

In any of the above examples, the exposed edges 128 of the laminae 100, 102 in the composite structure 101 may be smoothed (e.g. ground, sanded, carved, or milled), to impart a smooth surface or finish. For example, the punch working surface 150b and the die working surface 152b can be sanded, ground, milled, carved or otherwise made smooth after assembly. This may be useful in forming thin materials where a visible print-through of the laminae is undesirable. Further, in some examples, the metal laminae 100 can be made slightly smaller to provide a substrate margin that can be sanded to shape.

A system and method for additive manufacturing will now be described with reference to FIGS. 19 to 26. The system and method employ the barbed metal lamina 100 and substrate lamina 102 described above to manufacture three-dimensional objects in the form of multi-layer composite structures, optionally in an automated manner and for mass production. The system and method may be employed to manufacture any number and type of objects, including the die sets and bicycle frame described above. For simplicity, in FIGS. 19 to 26, a doorknob is used as an example three-dimensional object manufactured by the system and method.

The term "three-dimensional" as used with reference to FIGS. 19 to 26 is used in its traditional sense, and refers to objects having a length, a width, and a height. The system and method described with reference to FIGS. 19 to 26 are not limited to multi-layer composite structures having three-dimensional surfaces (e.g. as shown in FIGS. 6 and 7), and may also be used to make multi-layer composite structures having two-dimensional surfaces.

Figure 19:
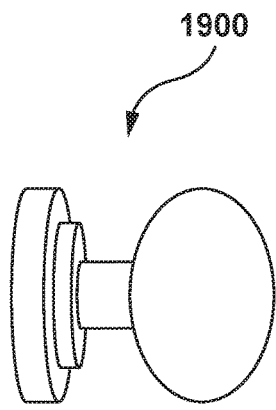
FIG. 19 is a perspective view of an example three-dimensional object made by the additive manufacturing process described herein.
Figure 20:
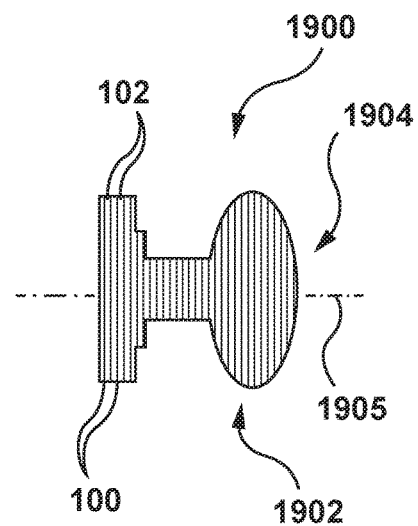
FIG. 20 is a side view of the object of FIG. 19.
Figure 21:
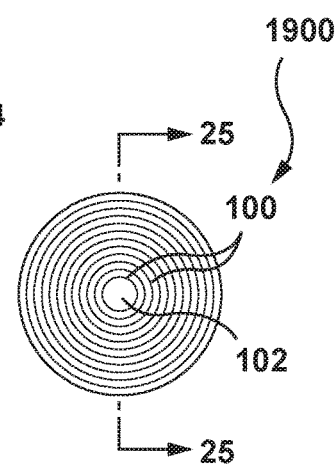
FIG. 21 is an end view of the object of FIG. 19.

Referring to FIGS. 19 to 21, a multi-layer composite doorknob 1900 is shown. The doorknob 1900 includes alternating barbed metal laminae 100 and substrate laminae 102, pressed together so that the barbs 104 (shown in FIGS. 25 and 26) of the metal laminae 100 penetrate the substrate lamina to bind the laminae together, as described hereinabove with respect to FIGS. 1 to 3. For simplicity, the individual laminae are not shown in FIG. 19.

Figure 22:
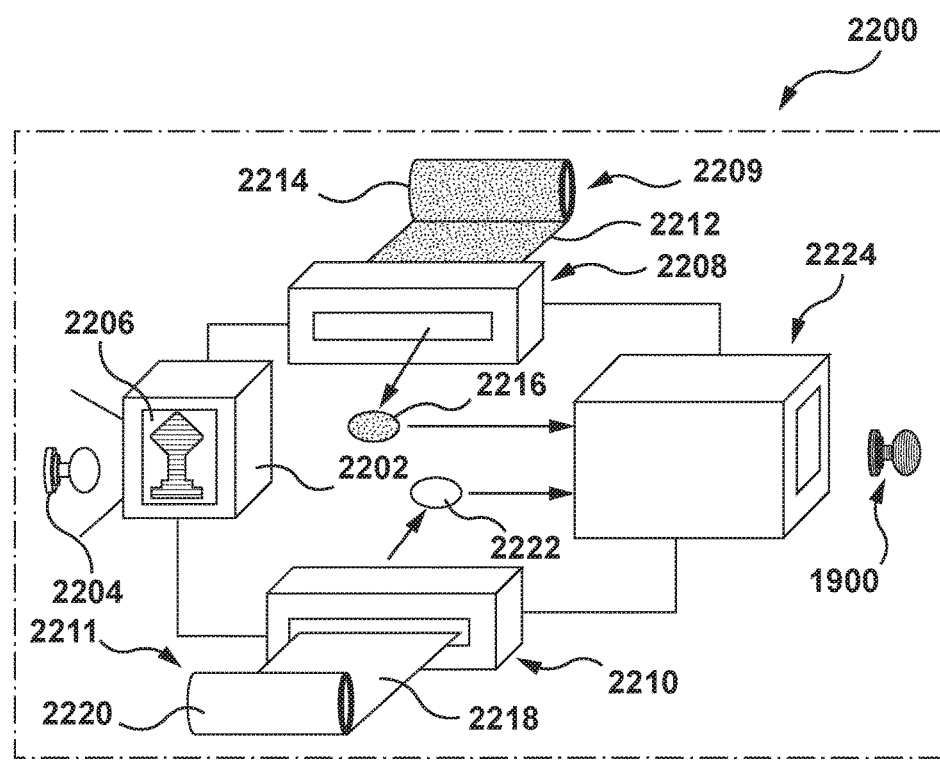
FIG. 22 is a schematic view of a system for additive manufacturing of a three-dimensional object, such as the object shown in FIG. 19.
Figure 23:
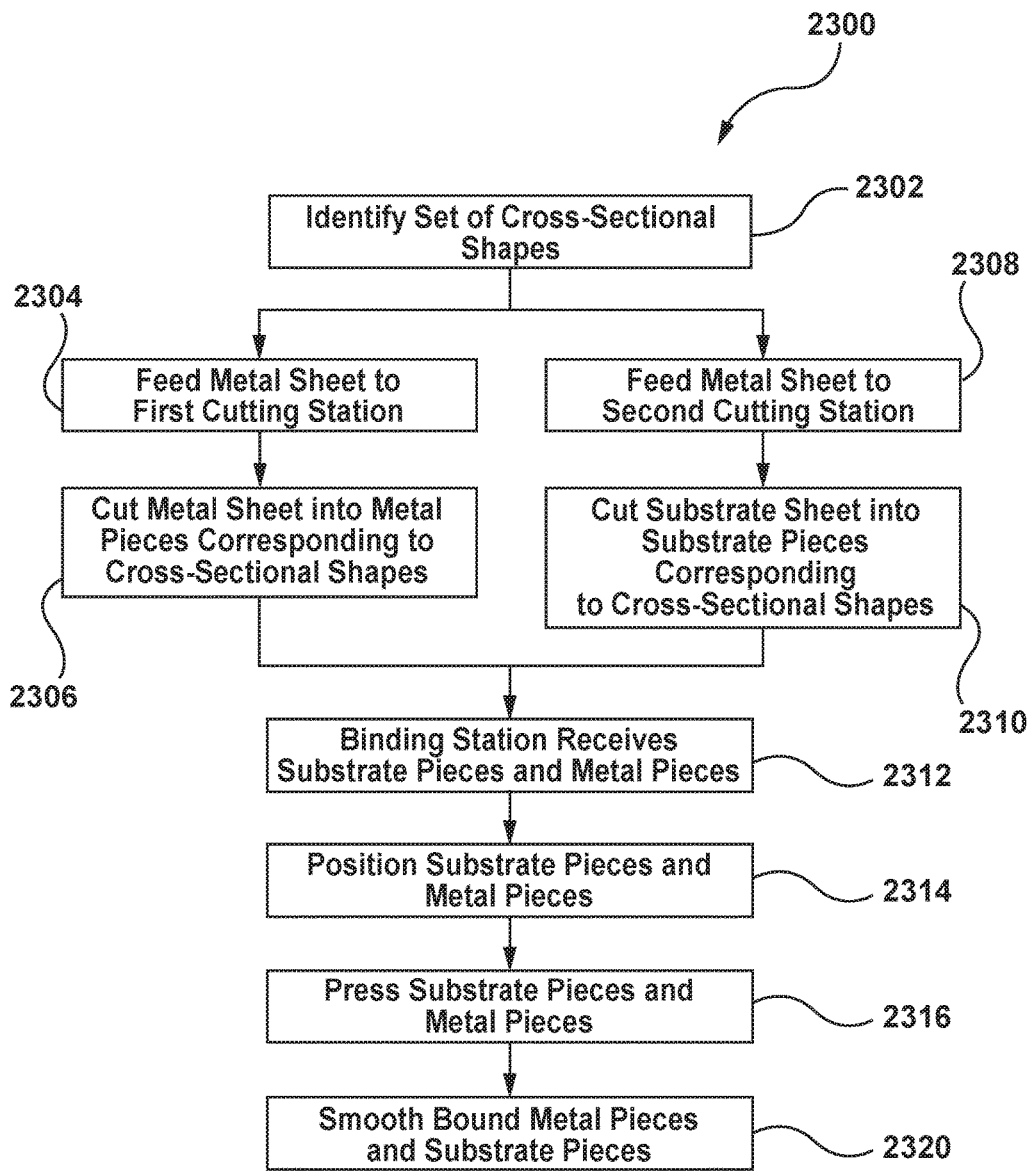
FIG. 23 is a flow-chart of a method for additive manufacturing of a three-dimensional object, such as the object shown in FIG. 19.

Referring to FIGS. 22 and 23, an example system 2200 and method 2300 for manufacturing the doorknob 1900 are shown. The system 2200 and method 2300 can optionally be used for mass manufacturing of the doorknob 1900. For simplicity, the system 2200 will be described with respect to the method 2300, and vice versa. However, the system 2200 may in some examples be operated according to another method, and the method 2300 may in some examples be carried out using another system.

Referring still to FIGS. 22 and 23, as a first step in manufacturing the doorknob 1900, a set of planar cross sectional shapes of the doorknob 1900 may be identified (step 2302). This may be done by a controller 2202 of the system 2200. For example, a prototype doorknob 2204 may be provided. The prototype doorknob 2204 may, for example, be an off-the-shelf product, and may be made by any method. The controller 2202 may include a three-dimensional scanner, which may scan the prototype doorknob 2204 to generate a CAD model of the prototype doorknob 2204. The controller 2202 may then use CAD software to take a set of cross-sectional slices through the model, to determine the cross-sectional shape of the prototype doorknob 2204 at a set of points along the prototype doorknob 2204.

Figure 24:
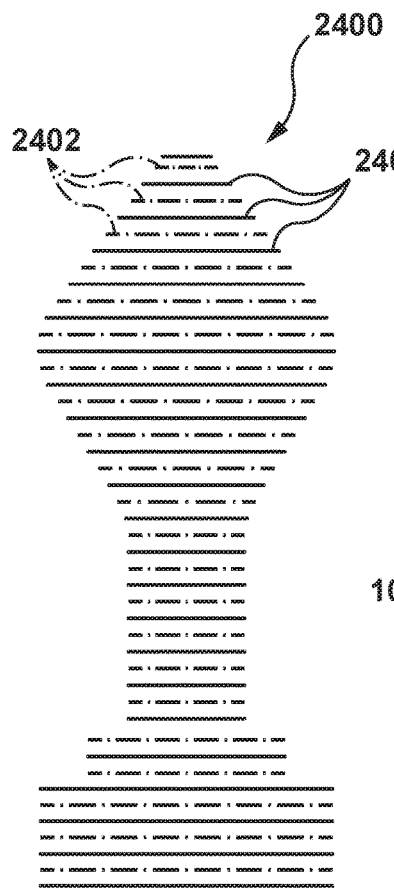
FIG. 24 is a perspective view of a set of cross-sectional shapes corresponding to the three-dimensional object of FIG. 19.

Referring to FIG. 24, an example of the set of planar cross sectional shapes 2400 is shown schematically. The set of cross sectional shapes 2400 extends in a sequence from a first end 1902 of the doorknob 1900 to a second end 1904 of the doorknob 1900 along an axis 1905 (shown in FIG. 20). In the example shown, the set of cross-sectional shapes includes a series of planar circles 2402, 2404 of varying diameter. The set of cross-sectional shapes 2400 may, for example, be displayed on a display 2206 of the controller 2202.

In alternative examples, the set of cross-sectional shapes may be identified in another manner. For example, a CAD model may be generated without a prototype available (e.g. the doorknob may be designed using CAD software).

Referring still to FIG. 22, the system 2200 can include at least one cutting station. In the example shown, the system 2200 includes a first cutting station 2208 and a second cutting station 2210, both of which can be connected to the controller 2202.

Referring to FIGS. 22 and 23, at step 2304, a metal sheet 2212 (also referred to herein as a barbed metal sheet) is fed to the first cutting station 2208 from a metal feed station 2209. The metal feed station 2209 may, for example, feed the metal sheet 2212 to the cutting station 2208 from a continuous roll 2214 of metal sheeting. The metal sheet 2212 is described above with respect to metal lamina 100, and includes a first face with a first plurality of barbs extending therefrom, and an opposed second face with a second plurality of barbs extending therefrom. Alternatively, where a metal lamina is to be provided at one of the ends 1902, 1904 of the doorknob 1900, the metal sheet may include barbs on only a first face thereof.

At step 2306, the first cutting station 2208 cuts the metal sheet 2212 into a plurality of planar metal pieces 2216 (also referred to as barbed metal pieces). The first cutting station 2208 cuts each metal piece 2216 to a planar shape (also referred to herein as a "metal piece shape") that corresponds to a respective one of the planar cross-sectional shapes (shown in FIG. 24). For example, the first cutting station 2208 may cut the metal sheet 2212 into a set of planar circles of different diameters, each of which corresponds to a respective one of the planar circles 2402 shown in FIG. 24 (for simplicity, only some of the circles 2402 are labelled in FIG. 24).

At step 2308, a substrate sheet 2218 is fed to the second cutting station 2210 from a substrate feed station 2211. The substrate feed station 2211 may, for example, feed the substrate sheet 2218 to the cutting station 2210 from a continuous roll 2220 of substrate sheeting. The substrate sheet 2218 is described above with respect to substrate laminae 102, and includes a first face and an opposed second face.

At step 2310, the second cutting station 2210 cuts the substrate sheet 2218 into a plurality of planar substrate pieces 2222. The second cutting station 2210 cuts each substrate piece 2222 to a planar shape (also referred to herein as a "substrate piece shape") that corresponds to a respective one of the planar cross-sectional shapes (shown in FIG. 24). For example, the second cutting station 2210 may cut the substrate sheet 2218 into a set of planar circles of different diameters, each of which corresponds to a respective one of the planar circles 2404 shown in FIG. 24 (for simplicity, only some of the circles 2404 are labelled in FIG. 24).

The first cutting station 2208 and the second cutting station 2210 may cut the metal sheet 2212 and the substrate sheet 2218 in a variety of ways, including but not limited to stamping, punching, milling, sanding, grinding, carving, or laser cutting.

The cutting steps 2306, 2310 may be automated based on the set of cross-sectional shapes identified by the controller 2202. For example, in instances where the cutting stations 2208, 2210 cut by laser cutting, the controller may be connected to the cutting stations 2208, 2210, and the laser may be controlled by the controller 2202. In alternative examples, after identifying the set of planar cross-sectional shapes, a set of punches and dies may be fabricated in order to stamp pieces into planar shapes corresponding to the planar cross sectional shapes.

Referring back to FIG. 22, the system 2200 further includes a binding station 2224. Referring also to FIG. 23, at step 2312, the binding station 2224 receives the metal pieces 2216 and the substrate pieces 2222. For example, the metal pieces 2216 and substrate pieces 2222 may be fed on a conveyor (not shown) to the binding station. In the binding station, the metal pieces 2216 and the substrate pieces 2218 are positioned in facing relation to each other in an alternating pattern, and in an order corresponding to the sequence of cross sectional shapes (step 2314). For example, the metal pieces 2216 and substrate pieces 2222 may be stacked on top of each other, in an alternating pattern, and in an order corresponding to the set of cross-sectional shapes 2400 shown in FIG. 24.

Referring still to FIGS. 22 and 23, the metal pieces 2216 and substrate pieces 2222 may then be pressed together in the binding station 2224 to force the barbs of the metal pieces 2216 to penetrate the substrate pieces 2222 and bind the metal pieces 2216 and substrate pieces 2222 together (step 2316).

In some examples, the pressing step 2316 may be carried out repeatedly as each one of the substrate pieces 2218 is positioned adjacent a respective one of the metal pieces 2216. For example, a first substrate piece 2222 may be positioned adjacent the first face of a first metal piece 2216, and a second substrate piece 2222 may be positioned adjacent the second face the first metal piece 2216 (i.e. the metal piece may be sandwiched between two substrate pieces). The first substrate piece, the first metal piece, and the second substrate piece may then be pressed together. An additional metal piece may then be positioned adjacent the second substrate piece, an additional substrate piece may be positioned adjacent the additional metal piece, and the additional substrate piece, the additional metal piece, and the second substrate piece may be pressed together.

In alternative examples, the pressing step 2316 may be carried out after all of the metal pieces 2216 and the substrate pieces 2222 have been positioned in facing relation to each other in an alternating pattern.

The pressing step 2316 may be carried out in a number of ways, including but not limited to applying a roller or a press to one of the substrate pieces.

In the example shown, the positioning 2314 and pressing 2316 steps are carried out in a single binding station 2224. In alternative examples, the system may include a separate positioning station and a separate binding station.

Figure 25:
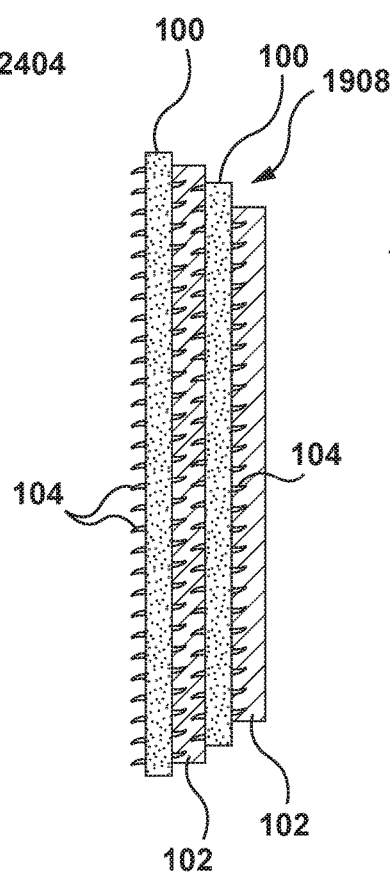
FIG. 25 is a cross section taken along line 25-25 in FIG. 21, prior to smoothing of the object.
Figure 26:
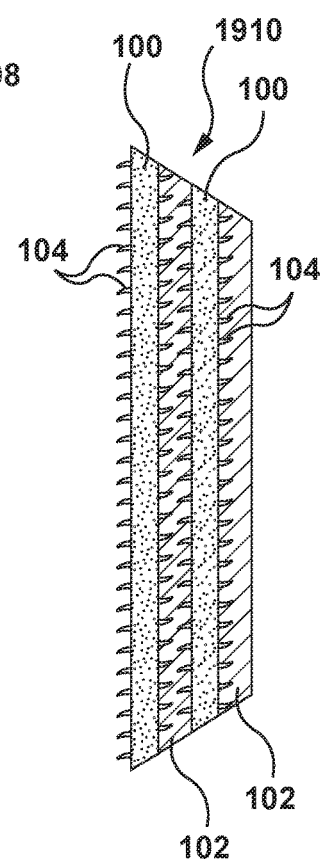
FIG. 26 is a cross section taken along line 25-25 in FIG. 21, after smoothing of the object.

Referring to FIG. 25, after the pressing step, the doorknob may have a substantially rough or jagged outer surface 1908. The method may further include a step of smoothing the bound metal pieces and substrate pieces (step 2320), to provide the doorknob with a smoothed outer surface 1910, shown in FIG. 26. The smoothing may be carried out in the binding station 2224, or in a separate smoothing station (not shown). After smoothing, the doorknob 1900 may be considered a finished product, as shown in FIGS. 19 to 21, and may be ready for use.

Optionally, as mentioned above, an adhesive may be applied between at least some of the metal pieces 2216 and substrate pieces. This may take place, for example, in the binding station 2224.

While the above description provides examples of one or more processes or apparatuses, it will be appreciated that other processes or apparatuses may be within the scope of the accompanying claims.

The invention claimed is:

1. A method for additive manufacturing of a three-dimensional object, comprising:
   a) identifying a set of planar cross-sectional shapes of the three-dimensional object, the set extending in a sequence from a first end of the three-dimensional object to an opposed second end of the three-dimensional object;
   b) cutting at least one metal sheet into a plurality of planar metal pieces, each metal piece cut to a respective metal piece shape corresponding to a respective one of the cross-sectional shapes, wherein the metal sheet has a first face with a first plurality of barbs extending therefrom, and an opposed second face with a second plurality of barbs extending therefrom;

c) cutting at least one substrate sheet into a plurality of planar substrate pieces, each substrate piece cut to a respective substrate piece shape corresponding to a respective one of the cross-sectional shapes; and d) positioning the metal pieces and the substrate pieces in facing relation to each other in an alternating pattern and in an order corresponding to the sequence, and pressing the metal pieces and substrate pieces together to force the barbs of the metal pieces to penetrate the substrate pieces and bind the metal pieces and substrate pieces together.

2. The method of claim 1, wherein step a) comprises generating a computer model of the set of cross-sectional shapes.

3. The method of claim 2, wherein step a) comprises scanning a prototype of the three-dimensional object, and generating the computer model based on the scan.

4. The method of claim 1, wherein steps b) and c) are automated based on the identified set of cross-sectional shapes.

5. The method of claim 1, wherein step b) comprises at least one of stamping, punching, milling, sanding, grinding, carving, and laser-cutting the metal sheet.

6. The method of claim 1, wherein step c) comprises at least one of stamping, punching, milling, sanding, grinding, carving, and laser-cutting the substrate sheet.

7. The method of claim 1, wherein the metal sheet is steel.

8. The method of claim 1, wherein the substrate sheet is wood.

9. The method of claim 1, further comprising, prior to step d), applying an adhesive between at least some of the metal pieces and substrate pieces.

10. The method of claim 1, wherein step d) comprises:
positioning a first one of the substrate pieces adjacent the first face of a first one of the metal pieces;
positioning a second one of the substrate pieces adjacent the second face of the first one of the metal pieces; and
pressing the first one of the substrate pieces, the first one of the metal pieces, and the second one of the substrate pieces together.

11. The method of claim 10, wherein step d) further comprises:
positioning an additional one of the metal pieces adjacent the second one of the substrate pieces;
positioning an additional one of the substrate pieces adjacent the additional one of the metal pieces; and
pressing the additional one of the substrate pieces, the additional one of the metal pieces, and the second one of the substrate pieces together.

12. The method of claim 1, wherein the pressing step is carried out repeatedly as each one of the substrate pieces is positioned adjacent a respective one of the metal pieces.

13. The method of claim 1, wherein the pressing step is carried out after all of the metal pieces and the substrate pieces have been positioned in facing relation to each other in an alternating pattern.

14. The method of claim 1, wherein the pressing step comprises applying a roller to one of the substrate pieces.

15. The method of claim 1, further comprising smoothing the bound metal pieces and substrate pieces.

* * * * *